Figure 1:
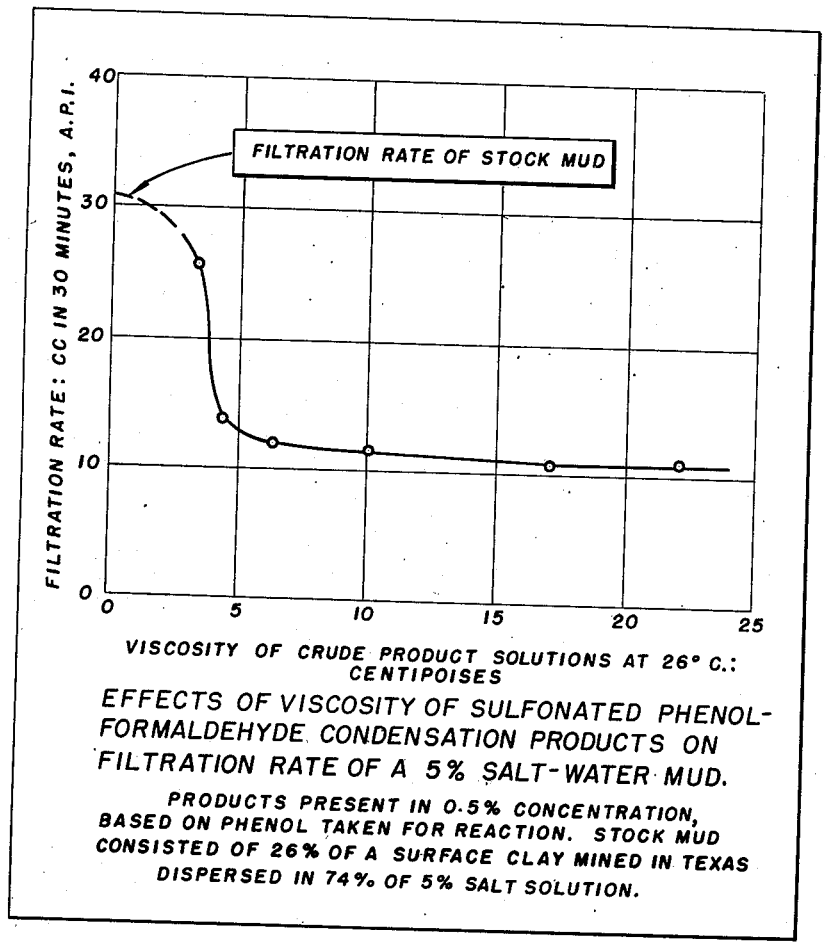

EFFECTS OF SULFONATED PHENOL-FORMALDEHYDE CONDENSATION PRODUCTS ON MUD PROPERTIES.
5% SALT-WATER MUD CONTAINING 26% OF A SURFACE CLAY MINED IN TEXAS AND 74% OF 5% SALT SOLUTION

EFFECTS OF SULFONATED PHENOL-FORMALDEHYDE CONDENSATION PRODUCTS ON MUD PROPERTIES.
FRESH-WATER CONTAINING 18% OF A SURFACE CLAY MINED IN TEXAS AND 1.6% OF WYOMING BENTONITE AND 80.4% OF TAP WATER.

EFFECTS OF SULFONATED PHENOL-FORMALDEHYDE CONDENSATION PRODUCTS ON MUD PROPERTIES.
PURIFIED PREPARATION NO. 17

EFFECTS OF 1:5 MIXTURE OF CAUSTIC SODA AND SULFONATED PHENOL-FORMALDEHYDE ON PROPERTIES OF A 25% SALT-WATER MUD.

EFFECT OF CALCIUM CHLORIDE ON
CONDUCTIVITY OF SOLUTIONS OF MUD ADDITIVES
(APPROX. 0.1 N $CaCl_2$ SOLUTION ADDED TO 300 CC OF TEST SOLUTION)

INVENTOR.
Richard A. Salathiel,
BY
ATTORNEY.

Patented June 15, 1954

2,681,312

UNITED STATES PATENT OFFICE 2,681,312

AQUEOUS SUSPENSIONS OF FINELY DIVIDED SOLIDS

Richard A. Salathiel, Houston, Tex., assignor, by mesne assignments, to Standard Oil Development Company, Elizabeth, N. J., a corporation of Delaware Application December 4, 1951, Serial No. 259,790

12 Claims. (Cl. 252—8.5)

The present invention is directed to an aqueous suspension of finely divided solids and to a method of preparing an aqueous suspension of finely divided solids having a low filtration rate.

This application is a continuation-in-part of my copending application Serial No. 178,375, filed August 9, 1950, entitled "Aqueous Suspensions of Finely Divided Solids," now abandoned.

In many arts, dispersions or suspensions of finely divided solid materials in an aqueous liquid vehicle are employed. Examples of such arts are the ceramic art, the cement treating art, and the drilling-mud treating art. In the employment of such dispersions or suspensions, experience has demonstrated that the loss of water by filtration therefrom may be excessive. As a matter of fact, the tendency to lose water by filtration may be so excessive as to prohibit the use of such suspensions or dispersions for some purposes. For example, the loss of water by filtration from a drilling mud may be so great as to impair seriously or even to destroy its usefulness in operations connected with the drilling of boreholes into subsurface formations. This invention, therefore, is concerned primarily with reducing the loss of water by filtration from dispersions or suspensions of finely divided solid materials in an aqueous liquid vehicle. It is particularly adapted to the treatment of aqueous suspensions or dispersions of finely divided solid materials used as a drilling fluid in the drilling of boreholes into subsurface formations by the rotary drilling method.

In the rotary method of drilling boreholes, an aqueous suspension of finely divided solids, commonly referred to as drilling mud, is pumped down the drill stem, through the openings in the drill bit, and upwardly through the annular space between the drill stem and the walls of the borehole to the surface of the earth. A primary purpose for employing the drilling mud is to pick up the cuttings produced by the drill bit and to transport these cuttings to the surface of the earth. The drilling mud also serves other important functions such as lubricating the bit and the drill stem, cooling the bit, and furnishing a hydrostatic pressure head to prevent flow into the borehole of formation fluid, such as oil, gas, and water from the various strata penetrated by the drill bit. In certain cases it is highly desirable that the mud form a thin, difficultly permeable coating on the walls of the borehole for the purpose of reducing loss of water from the borehole to the formation and thereby reducing softening of borehole walls and caving into the drill hole. It is preferable that the filter cake formed on the walls of the borehole be thin rather than thick so as to avoid mechanical difficulties in moving the bit in and out of the hole and in placing casings in the hole.

The aqueous suspensions of finely divided solids employed as a drilling fluid in rotary drilling operations are sometimes prepared by admixing a suitable amount of commercial clay with water. Heavy materials such as barytes, iron oxide, and barium sulfate, as well as calcium carbonate, silica, and the like are often added to such a suspension in order to increase its specific gravity. In many cases, however, the drilling fluid used in oil and gas wells is prepared in the process of drilling by dispersing in water the cuttings produced in the borehole. Weighting materials, clays, and chemicals may, of course, be added to the drilling fluid prepared in the last mentioned manner. The water employed may suitably be fresh water or salt water.

Almost any fluid will perform some of the aforementioned functions, such, for example, as cooling the drill bit, but to perform some of the other functions, it is necessary that the drilling fluid employed possess certain very definite properties. For example, a drilling mud may have sufficient gel strength to prevent settling of solids from the mud when circulation of the mud is stopped, but, at the same time, its other properties may be such as to result in the deposition of a thick filter cake on the borehole walls rather than the preferred thin cake. When large amounts of water filter from the mud into the formations surrounding the borehole, the solids content of the mud remains as a filter cake on the wall of the hole, reducing the size of the annular passage. Sloughing of such a thick filter cake may cause the drill pipe to become stuck. On the other hand, the employment of a drilling fluid having a low filtration rate restricts to a relatively small amount the water that can escape from the mud under the pressure differential prevailing in the borehole. A small loss of water from the mud to the formation means, of course, that only a thin filter cake will be deposited on the borehole walls. Use of the proper mud will help to preserve the borehole walls intact.

Occasionally, drilling muds which naturally have a relatively low filtration rate may be prepared from borehole cuttings; however, it generally has been found necessary to incorporate amendatory agents in the mud to impart this desirable property thereto. It is common practice to employ starches, starch derivatives, and water-soluble natural gums for reducing the filtration rates of aqueous drilling muds. These materials have been used extensively in salt water muds, which of themselves generally have high filtration rates and which are not ordinarily amenable to control by the usual dispersing-agent type of mud-treating agents such as salts of polyphosphoric acids and tannin-caustic soda mixtures, agents widely used in fresh water muds. Water soluble, etherically bonded substituent derivatives of cellulose, such as sodium carboxymethylcellulose and hydroxyethylcellulose, have also been suggested as organic colloid additives for the reduction of filtration rates of drilling muds. Although these materials reduce the loss of water from the drilling muds by filtration, they may themselves impart other undesirable properties thereto. For example, it is known that some of the aforementioned additives increase the viscosity of drilling muds undesirably. The starches are objectionable in that they ferment, thereby losing their effectiveness as filtration rate reducers.

It is, therefore, an object of the present invention to provide an aqueous dispersion or suspension of finely divided solid material having little tendency to lose water by filtration therefrom. Another object of the present invention is to provide a method for reducing the loss of water from an aqueous dispersion or suspension of finely divided solid material. A further object is to provide a method of forming a filter cake on the walls of a borehole drilled by the rotary drilling technique; preferably, the filter cake is in the form of a thin, difficultly permeable coating. Another object of the present invention is to provide a drilling fluid suitable for use in the rotary drilling of boreholes into subsurface formations and having a low filtration rate. Another object of the present invention is to provide an agent which, on addition to the aqueous-base drilling fluid used in the drilling of boreholes into subsurface formations, will substantially reduce the loss of water therefrom by filtration. A further object of the present invention is to provide an agent which, on addition to a drilling fluid, will substantially reduce the loss of water therefrom by filtration, but which will not increase excessively the viscosity of the fluid or substantially affect its ability to maintain solids in suspension.

The method of the present invention may be described briefly as involving the addition to or maintenance in a mixture, dispersion, or suspension of finely divided solid material in an aqueous liquid vehicle of a sufficient amount of a non-cation selective, water soluble salt of sulfonated phenol-formaldehyde condensation product to reduce the tendency of the mixture, dispersion, or suspension to lose water by filtration. By employing the proper quantity of any one of the class of the aforementioned salts or mixtures thereof, the water loss by filtration from the dispersion or suspension is reduced to a low value. For example, the water loss by filtration from a drilling mud may be maintained at a low value by maintaining a filtration reducing amount of one or more of the aforementioned salts in the mud. Preferably, alkali metal salts, such as sodium, potassium, or lithium salts are employed.

The method of the present invention may be further described as a method of forming a filter cake on the wall of a well drilled into subsurface formations with well drilling tools wherein there is circulated in the well a water-base drilling mud containing colloidal particles of clayey material suspended in sufficient water to render the mud circulatable which comprises admixing with the drilling mud a non-cation selective, water soluble salt of sulfonated phenol-formaldehyde condensation product in an amount sufficient to lower the fluid loss through the filter cake but insufficient to increase the viscosity of the mud to such an extent as to render the mud uncirculatable. The walls of the well are contacted with the drilling mud containing the aforementioned condensation product to form a filter cake on the wall of the well so as to decrease the loss of fluid from the drilling mud content in the well into surrounding earthen formations.

The composition of the present invention may be described briefly as a mixture comprising finely divided solid material, an aqueous liquid vehicle in which the solid material is dispersed or suspended, and a sufficient amount of a non-cation selective, water soluble salt of sulfonated phenol-formaldehyde condensation product or mixtures thereof to reduce the loss of water from the mixture by filtration. The composition of my invention may consist of any dispersion or suspension of a finely divided solid, such as clay and/or weighting agents and the like, in an aqueous liquid vehicle, such as fresh water or salt water, and a minor amount of a non-cation selective, water soluble salt of sulfonated phenol-formaldehyde condensation product, the said salt being present in a sufficient quantity to reduce loss of water from the suspension or dispersion by filtration.

The preparation of the aforementioned non-cation selective, water soluble salts of sulfonated phenol-formaldehyde condensation product is carried out in such a way as to result in a material having the desired filtration reducing properties. The end product obtained is influenced by the nature of the starting materials used, the ratio of starting materials, the temperature at which the condensation reaction is conducted, reaction time, etc. In order to prepare non-cation selective, water soluble salts of sulfonated phenol-formaldehyde condensation product suitable for my purpose a sulfonated mono-cyclic aromatic compound, di-functionally reactive with formaldehyde, is condensed with formaldehyde to form a high molecular weight water soluble product which is at least predominantly linearly polymeric. While many different sulfonated mono-cyclic aromatic compounds, di-functionally reactive with formaldehyde, may conceivably be employed, I have found sulfonated mono-cyclic phenolic materials eminently suitable. However, not all mono-cyclic phenolic materials are suitable for my purpose. For example, a phenol having a substituent group, other than the sulfonic acid residue, in a position ortho or para to the hydroxyl group contains only one position reactive with formaldehyde and will not, therefore, be capable of condensing with formaldehyde to give a high molecular weight product suitable for my purpose. On the other hand, a phenol containing a substituent group such as $CH_3-$, $C_2H_5-$, Cl, or the like, in the meta position may be mono-sulfonated and will still contain two positions reactive with formaldehyde and thus will be capable of forming high molecular weight predominantly linear condensation products with formaldehyde which are useful for my purpose.

Because phenol (mono-hydroxy benzene) is readily available and is convenient to handle, I have used phenol in the examples included herein. It will be understood, however, that other suitable phenolic compounds of the class cited above would have been equally applicable. The first step in the preparation of the water soluble salts of sulfonated phenol-formaldehyde condensation product from phenol is the sulfonation of the phenol. The sulfonation step is so conducted that the amount of mono-sulfonated phenol is large while the amount of poly-sulfonated phenol and unsulfonated phenol is small. As is well known, the sulfonic acid residue in the mono-sulfonated phenol will be almost entirely in either the ortho or para position, with respect to the hydroxyl group, thus leaving two positions in the phenolic molecule reactive with formaldehyde. To insure that the sulfonated product resulting from the sulfonation of phenol with sulfuric acid is predominantly mono-sulfonated, phenol is reacted with a slight molar excess of sulfuric acid at 100° C. for one-half hour. Under these conditions the mono-sulfonated phenol will consist predominantly of para-sulfonated phenol. However, the conditions under which the phenol is sulfonated are not critical and the aforementioned temperature and reaction time were chosen as convenient conditions for securing a predominantly mono-sulfonated phenol.

On completion of the aforementioned sulfonation step, an aqueous solution of formaldehyde is incorporated in the reaction products of the sulfonation step in order to carry out the condensation between the formaldehyde and the sulfonated phenol. The remaining unreacted sulfuric acid from the sulfonation step acts as the catalyst for the condensation reaction. The temperature at which this condensation reaction is carried out does not appear to affect critically the properties of the resulting product. In the examples included herein, the condensation reaction temperature was arbitrarily chosen to give a conveniently short condensation time while at the same time not giving a reaction rate so rapid as to preclude the stopping of the condensation reaction at the desired stage. Condensation reaction temperatures up to 100° C. may suitably be employed although lower temperatures, for example, 60° C., also result in desirable products so long as the condensation reaction is allowed to proceed for a sufficient length of time.

During the condensation reaction, the reaction mixture becomes increasingly viscous due to the increase in chain length of the sulfonated phenol-formaldehyde condensation product. Accordingly, it is necessary to permit the reaction to proceed until the molecular weight of the condensation product becomes sufficiently high, but the reaction must be terminated at the proper time so as to prevent the condensation product from increasing in molecular weight to the point of becoming insoluble in water. When the reaction mixture has attained the proper viscosity, the reaction is terminated. The condensation reaction may be terminated by diluting the reaction mixture with water and quickly neutralizing the diluted mixture with a suitable agent capable of neutralizing any remaining sulfuric acid and of reacting with the sulfonic acid radicals in the condensation product to form non-cation selective, water soluble metal salts of the condensation product. Ammonium hydroxide or an alkali metal hydroxide such as sodium, potassium, or lithium hydroxide may conveniently be employed in the neutralization step.

While the sulfonated phenol-formaldehyde condensation product employed in accordance with the present invention and hereinbefore described is predominantly linearly polymeric, it will be understood, of course, that there will be some cross linkage between the predominantly linearly polymeric chain structures. For example, if the sulfonated phenol from the sulfonation step contains some unreacted phenol or some meta-sulfonated phenol, there will be some cross linkage between the predominantly linearly polymeric chain structures because both of the aforementioned phenolic materials have three positions reactive with formaldehyde. Such cross linkages are not objectionable so long as the condensation product is predominantly linearly polymeric. On the other hand, if the sulfonated phenol from the sulfonation step contains di-sulfonated phenol (ortho-para-di-sulfonated or di-ortho di-sulfonated phenol), there will be some phenolic materials present in the condensation reaction mixture which, due to having only one position reactive with formaldehyde, will serve to terminate chain growth by becoming the terminal group on the linear chain. It will be apparent, therefore, that an effort should be made to keep the di-sulfonated phenol content of the sulfonated phenol at a minimum so as to reduce the possibility of vicarious termination of chain length during the condensation step.

A non-cation selective, water soluble salt of sulfonated phenol-formaldehyde condensation product having filtration reducing properties made in accordance with the hereinbefore described procedure was prepared in the following manner: 75 parts by weight of phenol were dissolved in 131 parts of concentrated sulfuric acid and heated at 100° C. for half an hour and then cooled to 60° C. 78 parts of a 40-volume per cent formaldehyde solution and 232 parts of water were added to the aforementioned cooled reaction mixture and the resulting solution heated at 85° C. for 46 minutes at which time the hot solution viscosity was 95 centipoises. The reaction was quickly terminated by adding 300 parts of cold water to the reaction mixture and neutralizing the diluted reaction mixture to a phenolphthalein end point by adding 229 parts of 40% caustic soda solution. The neutralized reaction mixture was further diluted with water, the resulting solution (1050 parts by weight) having a viscosity at 26° C. of 24 centipoises. The concentration of the sodium salt of sulfonated phenol-formaldehyde condensation product based on the starting weight of the phenol was 7.15 weight per cent. This solution will hereinafter be referred to as crude sodium salt of sulfonated phenol-formaldehyde condensation products and may be used in this form as a filtration reducing agent in accordance with the present invention or it may be further purified and the purified form so used.

It was noted during the course of the aforedescribed preparation that the hot solution viscosity increased very slowly at first and then later increased at an accelerated rate. For example, after 29 minutes, the hot solution viscosity was 3.9 centipoises; after 39 minutes from the start of the reaction, the hot solution viscosity was 13 centipoises; and after 42 minutes, it was 20 centipoises. As before stated, after 46 minutes, the hot solution viscosity was 96 centipoises.

Since at least a moderately high viscosity in the product is essential if it is to be effective in reducing filtration rate of a drilling mud and since the reaction mixture will set to a worthless gel if the viscosity of the reaction mixture is permitted to become excessively high, it is essential that the viscosity of the reaction mixture be checked frequently near the end of the reaction time and that the reaction be promptly quenched once the desired stage has been reached.

Purification would consist principally of eliminating most of the sodium sulfate from the crude solution. Sodium sulfate may be precipitated from the crude solution by adding denatured alcohol thereto and then seeding the mixture of crude solution and alcohol with finely divided sodium sulfate. For example, most of the aforementioned sulfate was removed from the aforementioned crude solution by adding 350 parts of denatured alcohol thereto, seeding the mixture of crude solution and denatured alcohol with finely divided sodium sulfate, and cooling the mixture with occasional stirring. The separated sodium sulfate was filtered off and washed with 290 parts of an aqueous alcohol solution. The filtrates were then combined and 200 parts of isobutyl alcohol were added thereto. The addition of isobutyl alcohol caused separation of the solution into two liquid layers, the desired water soluble salts of sulfonated phenol-formaldehyde condensation product being in the lower layer. Accordingly, the upper layer was discarded while the lower layer (413 parts by weight) was mixed with water to give 524 parts of solution. This solution was heated on a water bath and a stream of air blown through it to remove substantially all of the organic solvent impurities, water being added to make up for the loss in weight due to vaporization of the organic solvent impurities. The resulting solution was highly viscous and contained 14.3 weight per cent of non-cation selective, water soluble salts of sulfonated phenol-formaldehyde condensation products based upon the starting phenol. This solution was the purified product and will hereinafter be referred to as purified water soluble salts of sulfonated phenol-formaldehyde condensation products.

The amount of non-cation selective, water soluble salts of sulfonated phenol-formaldehyde condensation products required to give the desired reduction in loss of water by filtration from a suspension of finely divided solids in an aqueous liquid vehicle will vary with the circumstances over a reasonably wide range and the amount employed in a specific suspension or dispersion will depend upon the characteristics of the suspension to be treated. Experience has shown, however, that between 0.1 weight per cent and 3.0 weight per cent of the salts, based on the weight of the suspension or dispersion, will ordinarily give satisfactory results. In some instances even less than 0.1 weight per cent gives favorable results, although, ordinarily, little reduction in filtration rate is obtained when smaller amounts than this are employed. In some instances it may be desirable to add more than 3.0 weight per cent of the salt to a suspension although amounts in excess of 3.0 weight per cent ordinarily give little additional reduction in filtration. Usually, an amount in the range of 0.1 weight per cent and 1.0 weight per cent gives satisfactory results. When employed in accordance with the present invention, the non-cation selective, water soluble salts of sulfonated phenol-formaldehyde condensation products may be added in the form of the heretofore mentioned crude solution or in the form of the heretofore mentioned purified form. When, for example, it is desired to reduce the filtration rate of a drilling mud, either of the aforementioned solutions may be incorporated with the mud at a suitable point in the mud circulation system, such as in the mud ditch. It may be desirable to use a mixing device, such as a cone and jet mixer, or the equivalent thereof, for incorporating the solution with the drilling mud. If desired, the crude or purified solutions may be vacuum dried and ground and added to muds in powdered solid form. It has been found that in some instances the filtration reducing properties of the non-cation selective, water soluble salts of sulfonated phenol-formaldehyde condensation product is enhanced by also adding relatively minor amounts of an alkali metal hydroxide, such as sodium hydroxide, a material which is sometimes already present in the mud. The amounts in which the sodium hydroxide should be added and the circumstances in which its presence is most beneficial will be further discussed hereinafter.

The water soluble salts of sulfonated phenol-formaldehyde condensation products used in the present invention are not to be confused with the cation selective resinous materials commonly employed in various industries, such as the water treating industry, for removal of cations from aqueous solutions containing same. On the contrary, the water soluble salts of sulfonated phenol-formaldehyde condensation products employed in the present invention are non-cation selective. The fact that the materials of my invention are non-cation selective is demonstrated by each of three different series of experiments which I have made.

In the first series of experiments, equal portions of a prepared solution containing 16.9 mgs. of calcium ion per cc. were selected for tests. Crude sodium salts of sulfonated phenol-formaldehyde condensation product (referred to hereinafter in these three series of experiments as SPF) made as hereinbefore described were added to one portion of the prepared solution in sufficient amount to give a purified SPF-to-calcium ion ratio of about 4:1. Both the portion containing the SPF and the portion containing no SPF were analyzed for calcium by the Versinate method, which was described by Diehl et al. in the Journal of the American Waterworks Association (January 1950), pages 40 to 48. The portion containing no SPF showed 17.13 mgs. of calcium ion per cc. and the sample containing the SPF showed 17.09 mgs. of calcium ion per cc. This series of experiments makes it apparent that the sodium salt of sulfonated phenol-formaldehyde condensation product hereinbefore described possesses no tendency to remove calcium ions from solution.

In a second series of experiments wherein water hardness tests were run according to the method given by Snell and Biffen in their book, "Commercial Methods of Analysis," McGraw-Hill (1944), four test samples were prepared by adding 0.180 cc. of a calcium chloride solution containing 16.9 mgs. of calcium ion per cc. to 50 cc. of distilled water. Sufficient crude SPF was added to two of these test samples to give 70 mgs. of the active material in each sample. Each of the four samples was then titrated with a standard soap solution to determine the amount required to remove the calcium ions. Complete removal of calcium ions is indicated in this procedure by foam formation in the solution. In the case of each of the two samples containing no SPF, 5.8 cc. of the soap solution were required to produce foaming. In the case of one of the samples containing SPF, the amount of soap solution required was 5.69 cc., and in the case of the other sample the requirement was 5.70 cc. This series of experiments, like the first series, shows that the sodium salt of sulfonated phenol-formaldehyde condensation product made as hereinbefore described possesses no tendency to remove calcium ions from solutions containing them; this is so even though the weight ratio of active SPF-to-cacium ion is about 70:3.

In a third series of experiments, test solutions were prepared by adding small quantities of different materials to five separate 300 cc. portions of distilled water. The materials added to each of the five portions are indicated in Table I below and in Fig. 9. A standard solution of approximately 0.10 N calcium chloride was then added incrementally to the 300 cc. test solutions. After each incremental addition was thoroughly mixed with the solution, the solution was tested in a conductivity cell. After each test, the solution was transferred from the conductivity cell back into the mixing flask. Both the conductivity cell and the mixing flask were kept in a constant temperature water bath to avoid changes in temperature during the test. In order to obtain comparable results, the specific conductance of the test solutions was adjusted to approximately equal values by adding suitable amounts of sodium chloride to the solution prior to the test. The results obtained in this third series of experiments are presented in Table I below and are shown graphically in attached Fig. 9.

TABLE I

*Effect of calcium chloride on conductance of mud-treating chemicals*

| Material Added to 300 cc. of Water in Preparation for Test | Amount of 0.1 N Calcium Chloride Added to 300 cc. of Test Solution, cc. | Specific Conductance of Solution, Mhos | Temp., °C. | Remarks |
|---|---|---|---|---|
| 0.176 g. NaCl | 0 | 0.001202 | 25.8 | |
| Do | 2.00 | 0.001268 | 25.8 | |
| Do | 5.02 | 0.001367 | 25.8 | |
| Do | 8.00 | 0.001463 | 25.7 | |
| Do | 11.00 | 0.001557 | 25.7 | |
| Do | 15.00 | 0.001682 | 25.7 | |
| Do | 20.00 | 0.001828 | 25.7 | |
| 0.172 g. CaCl₂ | 0 | 0.001200 | 24.9 | |
| Do | 0.90 | 0.001230 | 24.9 | |
| Do | 2.69 | 0.001288 | 24.9 | |
| Do | 5.38 | 0.001373 | 24.9 | |
| Do | 8.97 | 0.001484 | 24.9 | |
| Do | 13.43 | 0.001618 | 24.9 | |
| Do | 17.92 | 0.001742 | 24.9 | |
| 0.415 g. SPF (solids)+ 0.1504 g. NaCl | 0 | 0.001171 | 24.9 | |
| Do | 0.98 | 0.001200 | 24.9 | |
| Do | 2.95 | 0.001260 | 24.9 | |
| Do | 5.90 | 0.001344 | 24.9 | |
| Do | 9.83 | 0.001452 | 24.9 | |
| Do | 14.76 | 0.001590 | 24.9 | |
| Do | 19.67 | 0.001726 | 24.9 | |
| 0.140 g. Sodium Hexametaphosphate+0.140 g. NaCl | 0 | 0.001251 | 25.0 | |
| Do | 1.00 | 0.001267 | 25.0 | |
| Do | 3.00 | 0.001313 | 24.9 | |
| Do | 6.00 | 0.001370 | 24.8 | |
| Do | 10.00 | 0.001432 | 24.8 | |
| Do | 15.00 | 0.001541 | 24.7 | Hazy. |
| 0.250 g. Sodium Hexametaphosphate+0.100 g. NaCl | 0 | 0.001221 | 25.1 | |
| Do | 1.00 | 0.001246 | 25.1 | |
| Do | 3.00 | 0.001293 | 25.1 | |
| Do | 6.10 | 0.001360 | 25.1 | |
| Do | 10.00 | 0.001432 | 25.0 | |
| Do | 15.00 | 0.001496 | 25.0 | |
| Do | 20.00 | 0.001564 | 25.0 | Hazy. |

Figure 9:
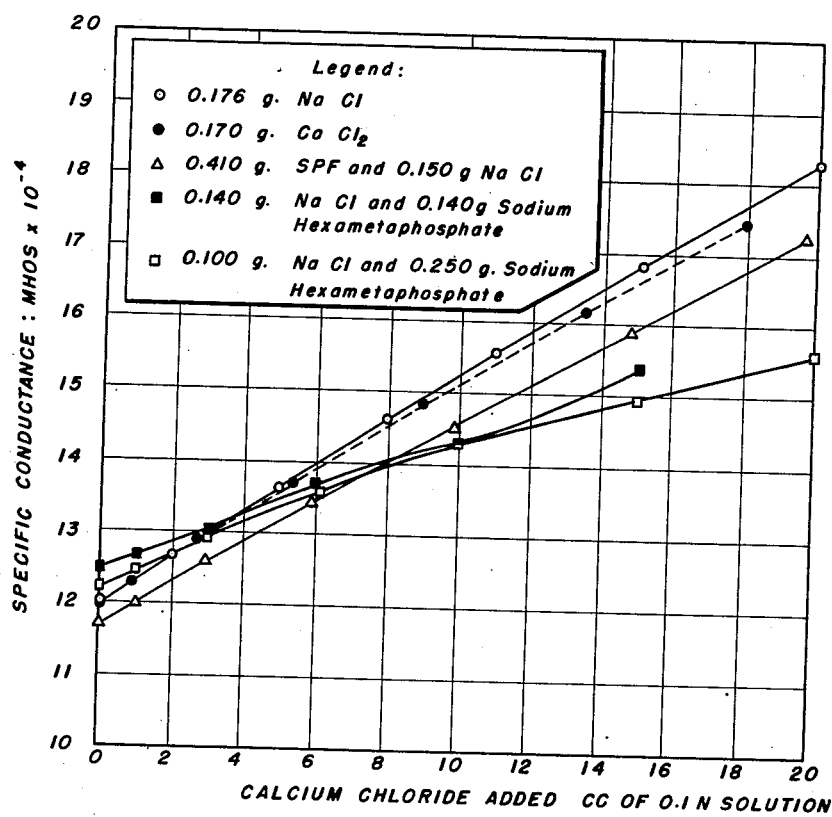

It will be noted from the foregoing table and from Fig. 9 that the addition of calcium chloride solution to the solution containing sodium chloride, to the solution containing calcium chloride, and to the solution containing SPF increased the conductivity of each of the solutions progressively, the curves for each of these three solutions being substantially straight lines and substantially parallel to each other. On the other hand, when the calcium chloride solution was added to the test solutions containing sodium hexametaphosphate, the rate of increase in specific conductance with increase in the amount of calcium ion added was considerably less than that observed for the three solutions containing no sodium hexametaphosphate. It will be further noted that the curvature of the lines plotted for the test solutions containing sodium hexametaphosphate is much greater than the curvature of the lines for the test solutions containing no hexametaphosphate. Obviously, the smaller slope and the greater curvature shown by the curves for the sodium hexametaphosphate solution as compared with the solutions containing no sodium hexametaphosphate are the result of the selective removal, or sequestering, of calcium ions by the hexametaphosphate. The removal of the calcium ions by the hexametaphosphate is further evidenced by the fact that the last additions of calcium chloride to the solutions containing sodium hexametaphosphate caused a haze in the solution, a condition due to the precipitation of a calcium hexametaphosphate complex.

After laboratory tests showed the effectiveness of the non-cation selective, water soluble salts of sulfonated phenol-formaldehyde condensation products for reducing the water loss by filtration from drilling muds, a study was made to determine the effects of different reaction conditions and of variations in the ratio of reactants on the properties of these products. The effects of changing the ratio of reactants and of varying the reaction conditions on the filtration reducing ability and other properties of the resulting condensation products, when added to a 5% salt water mud, are summarized in Table II below.

The data in Table II show that the method of preparing the non-cation selective, water soluble salts of sulfonated phenol-formaldehyde condensation products is not particularly critical from the standpoint of the effectiveness of these products in reducing filtration rate of the 5% salt water mud in which tested so long as the viscosity of the crude product (7.15 weight per cent concentration, based upon the phenol used) is above a value of about 6 to 7 centipoises at 26° C. Viscosity of the solutions is indicative of the molecular weight of the condensation products. It is, therefore, evident that the low or even moderately high molecular weight condensation products from the earlier stages of the condensation reaction, while possibly useful for some purposes, are not suitable for my purposes. It is only after the molecular weights of the condensation products become very high, not far short of being so high as to be insoluble in water, that they become suitable for my purpose. That about 6 or 7 centipoises at 26° C. is roughly the minimum viscosity at which filtration reduction is accomplished is further illustrated by Fig. 1 in which the viscosity at 28° C. of crude product solutions, prepared in the same way except for stopping the reaction at different stages, is plotted against the filtration rate of the 5% salt water mud to which the products were added. The composition of the mud is shown in Fig. 1.

in any of the muds even when as much as 1.1 weight per cent of the condensation product (concentration based on phenol) was added

TABLE II

*Crude sulfonated phenol-formaldehyde condensation products—relation between methods of preparation and properties and their effectiveness in treating 5% salt-water mud*

| Run No. | Sulfonation Reaction | | Condensation Reaction | | Time, Min. | Crude Product Solution Properties | | Effects of Products on Properties of a 5% Salt-Water Mud (Mud contained 0.50% "Phenol" added as 7.15% solution based on Phenol taken for reaction) | | |
|---|---|---|---|---|---|---|---|---|---|---|
| | Mols Sulfuric Acid/ Mol Phenol | Reaction Temp., °C. | Mols Formaldehyde/ Mol Phenol | Temp., °C. | | Viscosity at 26° C., cps. | Clarity of Solutions | Viscosity, 600 R.P.M., Stormer, cps. | Initial Gel Strength, Stormer, gms. | Filtration Rate, cc., in 30 Min., A.P.I. |
| Blank [1] | | | | | | | | 26 | 30 | 30.5 |
| 2 | 1.92 | 150 | 2.1 | 85 | 27 | 6.4 | Clear | 21 | 19 | 12.0 |
| 3 | 1.92 | 150 | 2.1 | 87 | 22 | 17 | Slight haze | 21 | 20 | 10.8 |
| 4 | 1.92 | 150 | 2.1 | 88 | 18 | 4.4 | Clear | 21 | 20 | 13.9 |
| 5 | 1.92 | 155 | 2.1 | 88 | 17 | 3.4 | do | 21 | 20 | 25.7 |
| 6 | 1.92 | 150 | 2.1 | 87 | 24 | 10 | do | 21 | 19 | 11.6 |
| 7 | 1.92 | 150 | 2.1 | 84 | 32 | 22 | Slight haze | 21 | 20 | 11.1 |
| 8 | 1.15 | 146 | 2.1 | 85 | 97 | 16 | Muddy—some sediment | 21 | 20 | 9.5 |
| 9 | 1.92 | [2] 148 | 2.1 | 85 | 53 | 17 | Clear | 22 | 19 | 14.8 |
| 10 | 1.92 | [3] 150 | 2.1 | 87 | 22 | 13 | Slight haze | 21 | 19 | 11.6 |
| 11 | 1.92 | 150 | 1.2 | 84 | 36 | 20 | Clear | 21 | 20 | 9.1 |
| 12 | 1.92 | [2,4] 150 | 1.2 | 84 | 88 | 16 | Clear—dark color | 22 | 20 | 16.6 |
| 13 | 1.15 | [3] 150 | 1.2 | 85 | 219 | 29 | Muddy—some sediment | 23 | 21 | 8.0 |
| 14 | 1.15 | [2] 150 | 1.2 | 91 | 116 | 20 | Clear—slight sediment | 23 | 20 | 8.4 |
| 15 | 1.43 | 148 | 1.2 | 87 | 86 | 24 | Muddy—much sediment | 23 | 20 | 8.2 |
| 16 | 1.15 | 148 | 1.2 | 76 | 513 | 14 | Muddy—sediment | 23 | 20 | 8.0 |
| 17 | 1.15 | 148 | 1.2 | 86 | 235 | 16 | Settled clear—much sediment | 23 | 20 | 8.3 |
| 18 | 1.92 | 102 | 1.2 | 88 | 19 | 23 | Slight haze | 22 | 20 | 8.9 |
| 19 | 1.92 | 102 | 1.2 | 71 | 103 | 13 | do | 22 | 20 | 8.7 |
| 20 | 1.56 | 102 | 1.2 | 85 | 64 | 22 | Strong haze—slight sediment | 22 | 19 | 7.8 |
| 21 | 1.73 | 102 | 1.2 | 86 | 42 | 25 | Hazy | 23 | 20 | 8.0 |
| 22 | 1.92 | 102 | 0.88 | 86 | 28 | 22 | Clear | 23 | 19 | 8.8 |
| 23 | 1.92 | 102 | 1.0 | 86 | 26 | 25 | do | 22 | 20 | 8.6 |
| 24 | 1.92 | 102 | 1.6 | 87 | 16 | 23 | do | 22 | 19 | 9.0 |
| 25 | 1.67 | 102 | 1.2 | 74 | 138 | 26 | Slight haze | 23 | 20 | 8.3 |
| 26 | 1.67 | 95 | 1.2 | 80 | 84 | 10.5 | Clear | 22 | 23 | 9.8 |
| 27 | 1.67 | 100 | 1.2 | 85 | 46 | 24 | do | 23 | 20 | 8.4 |

[1] Stock mud consisted of 26% of a surface clay mined in Texas and 74% of a 5% salt solution.
[2] Stream of air passed through flask rather than keeping flask closed as usual.
[3] Sulfonation mixture diluted and extracted with benzene prior to condensation with formaldehyde.
[4] Sulfonation time 90 minutes rather than 30 minutes used in all other cases.

Figure 2:
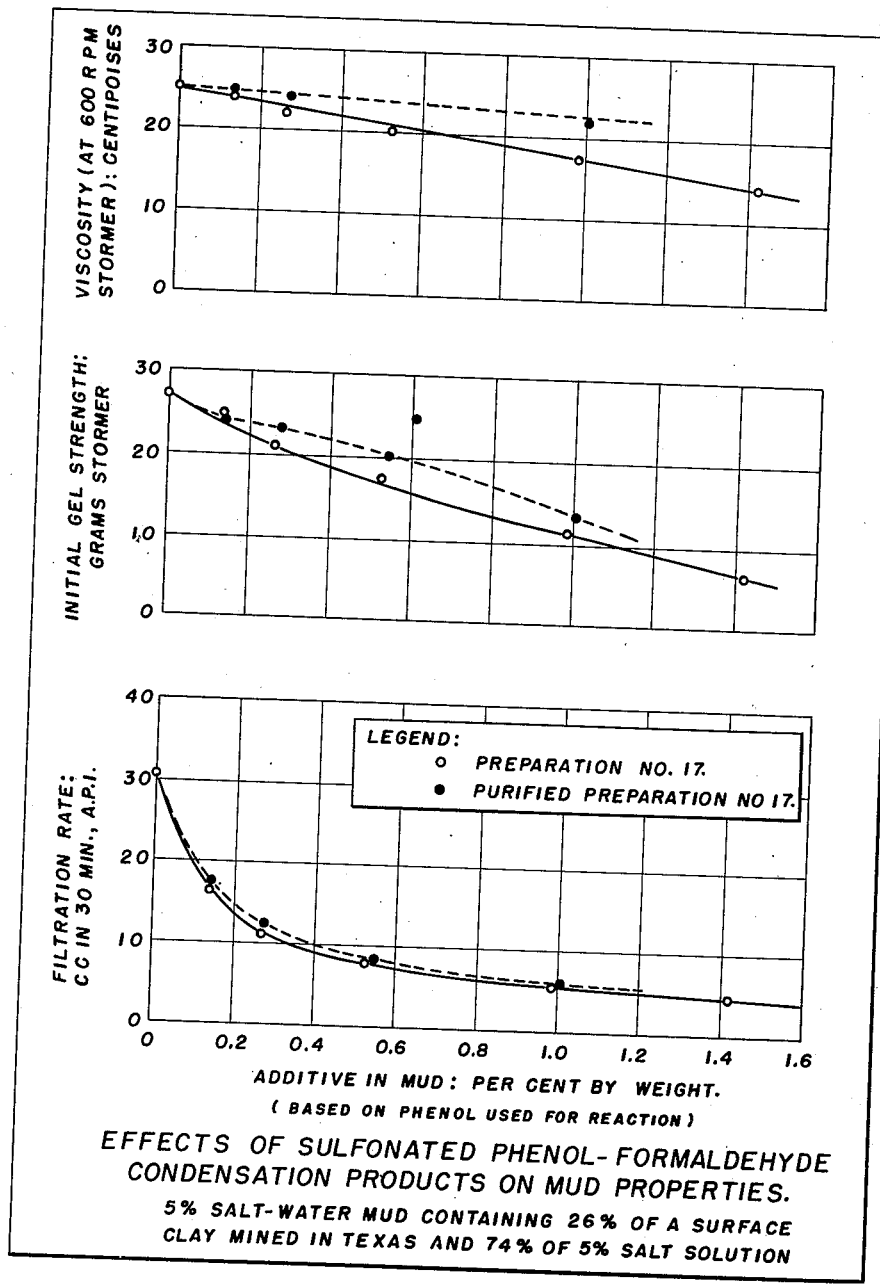
Figure 3:
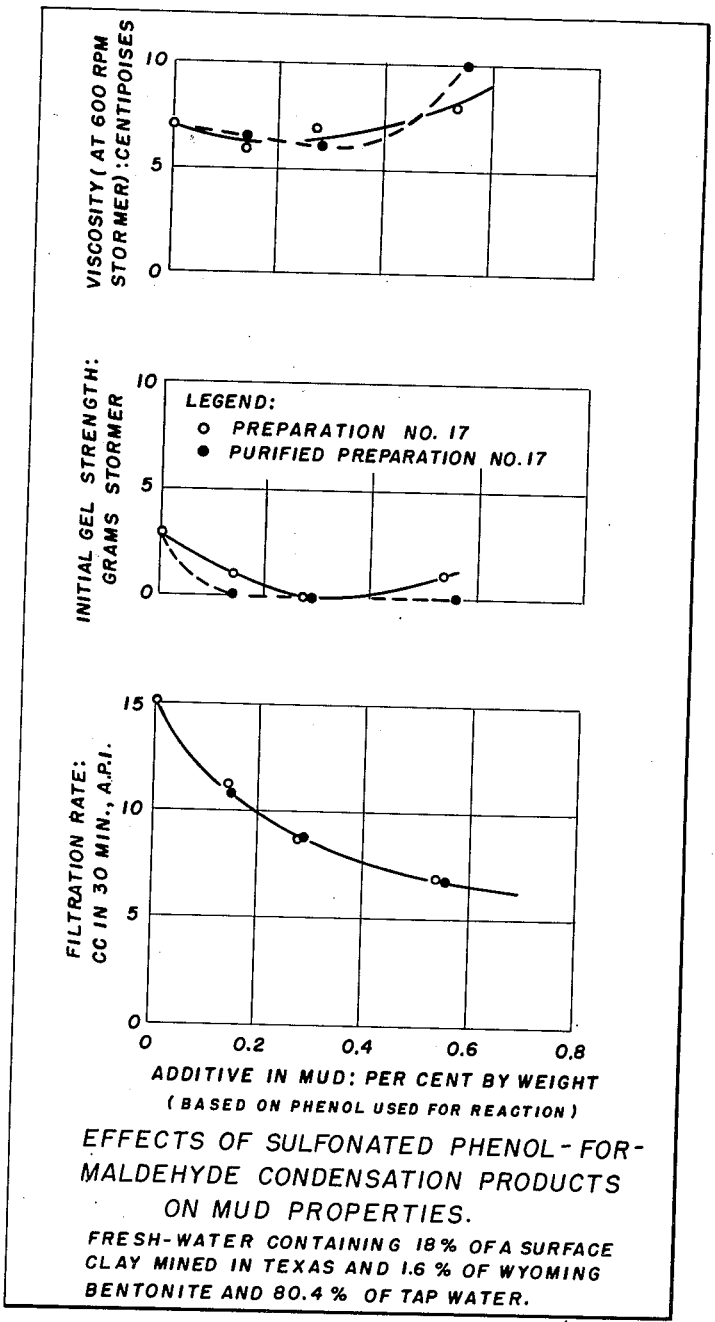

In order to determine whether or not purification of the crude product materially increases the effectiveness of the non-cation selective, water soluble salts of sulfonated phenol-formaldehyde condensation products, varying amounts of the crude product and of the purified product (preparation No. 17 of Table II), purified in the manner hereinbefore described, were added to a 5% salt water mud and to a fresh water mud. The results obtained are shown graphically in Figs. 2 and 3, Fig. 2 showing the results obtained with the 5% salt water mud and Fig. 3 showing the results obtained with the fresh water mud. The composition of these two muds is indicated in Figs. 2 and 3. The data plotted in Figs. 2 and 3 show that purification did not result in any appreciable change in the filtration reducing properties of the water soluble salts of sulfonated phenol-formaldehyde condensation products.

Figure 4:
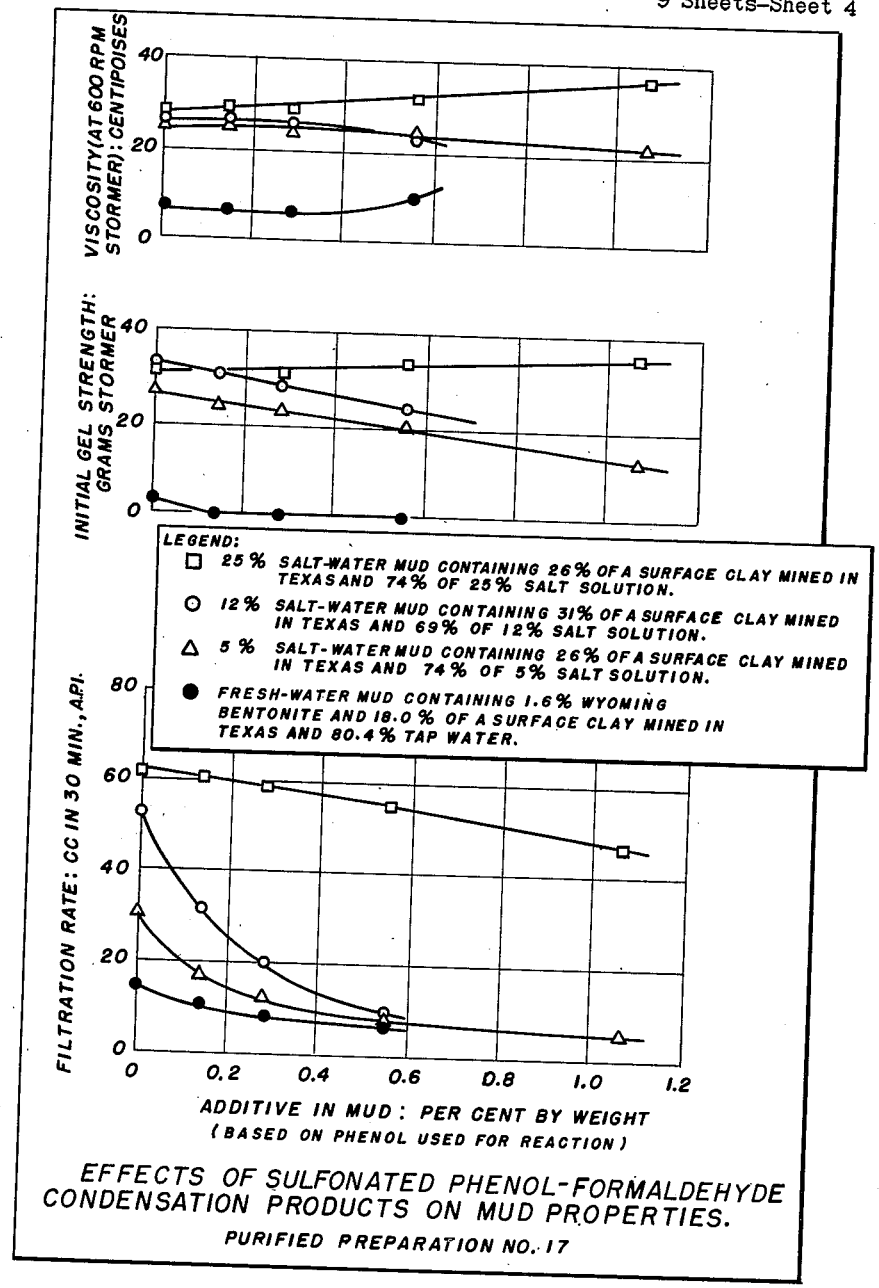

In order to determine the effectiveness of the non-cation selective, water soluble salts of sulfonated phenol-formaldehyde condensation products in muds of different salinity, varying quantities of purified preparation No. 17, purified in the manner hereinbefore described, were added to a fresh water mud, a 5% salt water mud, a 12% salt water mud, and 25% salt water mud. The composition of each of the aforementioned muds is given in Fig. 4 wherein the filtration rate, initial gel strength, and viscosity of each of these muds to which varying quantities of the purified condensation product were added are shown. It will be noted that viscosity and gel strength were not changed appreciably thereto. Filtration rate was reduced moderately in fresh water mud, strongly in the 5% and 12% salt water muds, and only slightly in the 25% salt water mud. This decreased effectiveness in the 25% salt water mud may be attributable to the fact that the salt content of the aqueous phase of the mud was sufficiently large to partially precipitate the non-cation selective, water soluble salts of sulfonated phenol-formaldehyde condensation products from the solution.

Figure 5:
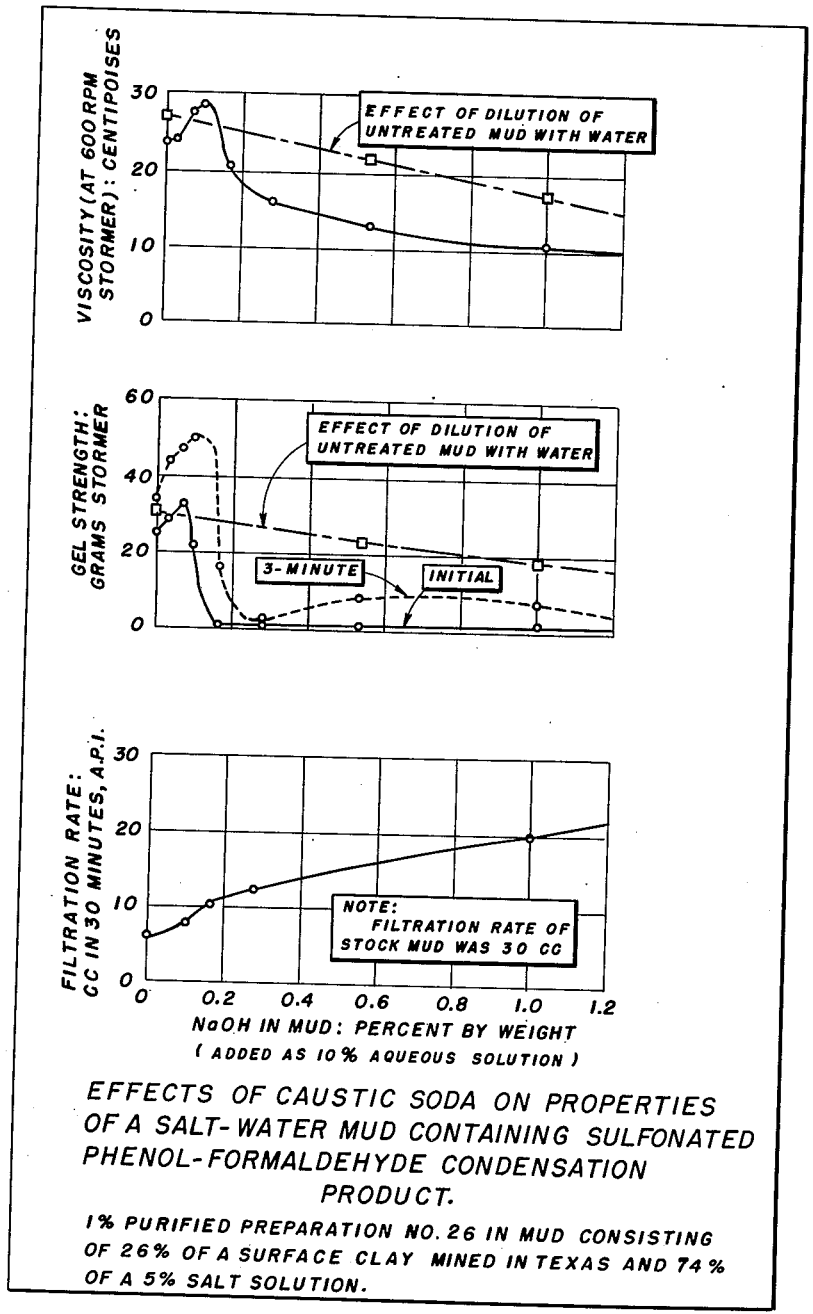

As hereinbefore mentioned, an alkali metal hydroxide, such as sodium hydroxide, may in some circumstances be used in conjunction with the non-cation selective, water soluble salts of sulfonated phenol-formaldehyde condensation products to enhance the effectiveness of the latter. In order to demonstrate the effect of adding an alkali metal hydroxide along with the condensation product of the present invention, varying amounts of sodium hydroxide were added to a 5% salt water mud containing 1 weight per cent of a purified non-cation selective, water soluble salt of sulfonated phenol-formaldehyde condensation product (purified preparation 26 of Table II). Filtration rate, gel strength, and viscosity were determined, the results being shown graphically in Fig. 5. These data show that the addition of less than 0.1 weight per cent of caustic soda increased viscosity and gel strength of the 5% salt water mud. On the other hand, additions of as much as 0.2 weight per cent or more of caustic soda strongly reduced both viscosity and gel strength. It will be further noted that the mud containing 1% of purified material but no sodium hydroxide had a filtration rate of 6.1. As sodium hydroxide was added in increasing quantities, the resulting filtration rate also increased, the mud containing 1.0 weight per cent of added sodium hydroxide having a filtration rate of 19.5 cc. in 30 minutes, API. This last mentioned value, although higher than when no caustic was added, is still substantially lower than the 30 cc. value of the mud having no water soluble salt of sulfonated phenol-formaldehyde condensation product or caustic added thereto.

Figure 6:
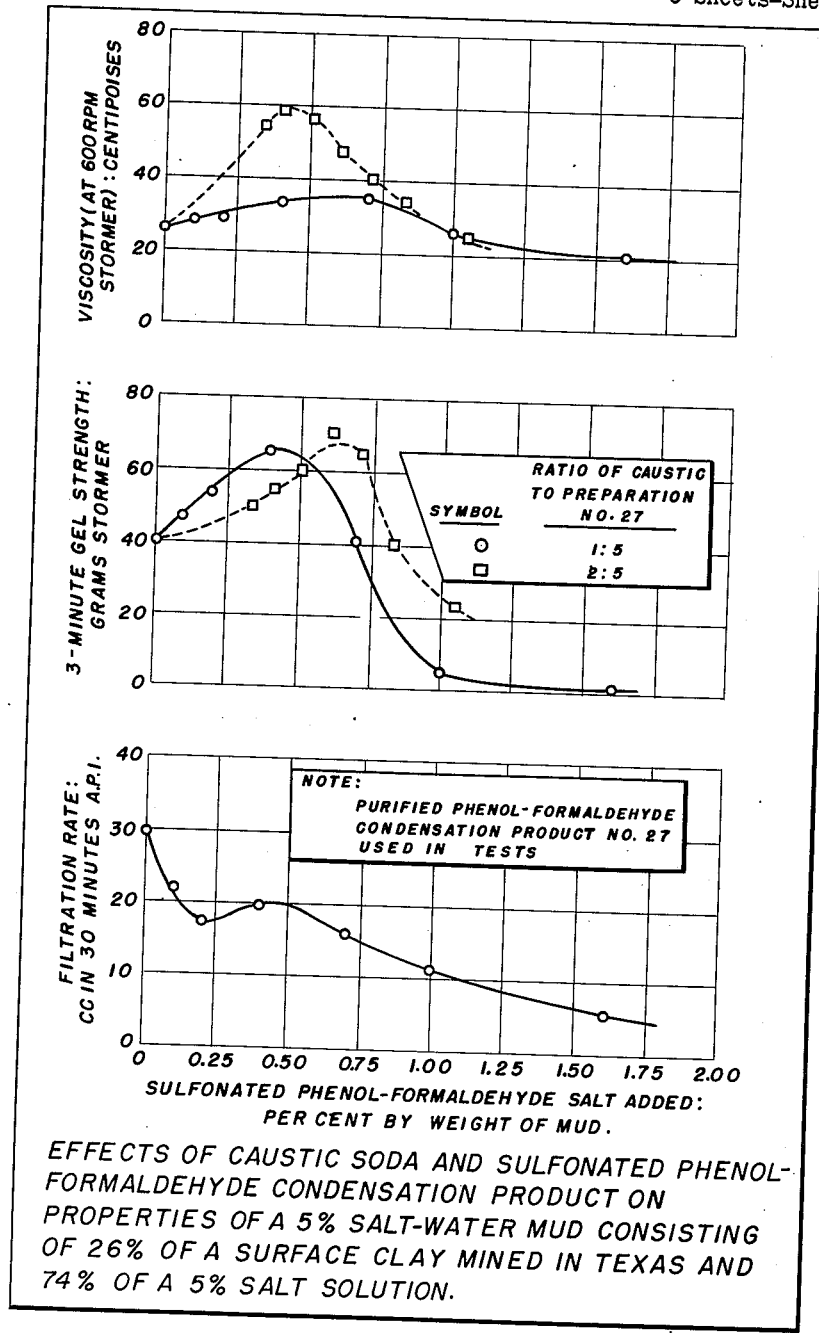

The effect on the mud properties of adding varying quantities of mixtures containing fixed amounts of caustic soda and a purified non-cation selective, water soluble salt of sulfonated phenol-formaldehyde condensation products (purified product No. 27 of Table II) to a 5% salt water mud was investigated. Two different mixtures were added to the mud. In the first mixture caustic soda was present in a ratio of 1:5 as compared to the condensation products; in the other mixture caustic soda was present in a ratio of 2:5 as compared to the condensation products. Varying quantities of each of these mixtures were added to the aforementioned mud and the filtration rate, gel strength, and viscosity were determined. Data obtained are shown graphically in Fig. 6 wherein filtration rate, gel strength, and viscosity are plotted against the concentration of condensation product in the mud. It will be noted that the addition of small quantities of these mixtures to the mud increased viscosity and gel strength somewhat while the addition of larger quantities decreased both gel strength and viscosity. It will be further noted that small additions of the 1:5 mixture decreased the filtration rate markedly and thereafter considerably larger amounts were required to reduce the filtration rate to substantially lower values.

Figure 7:
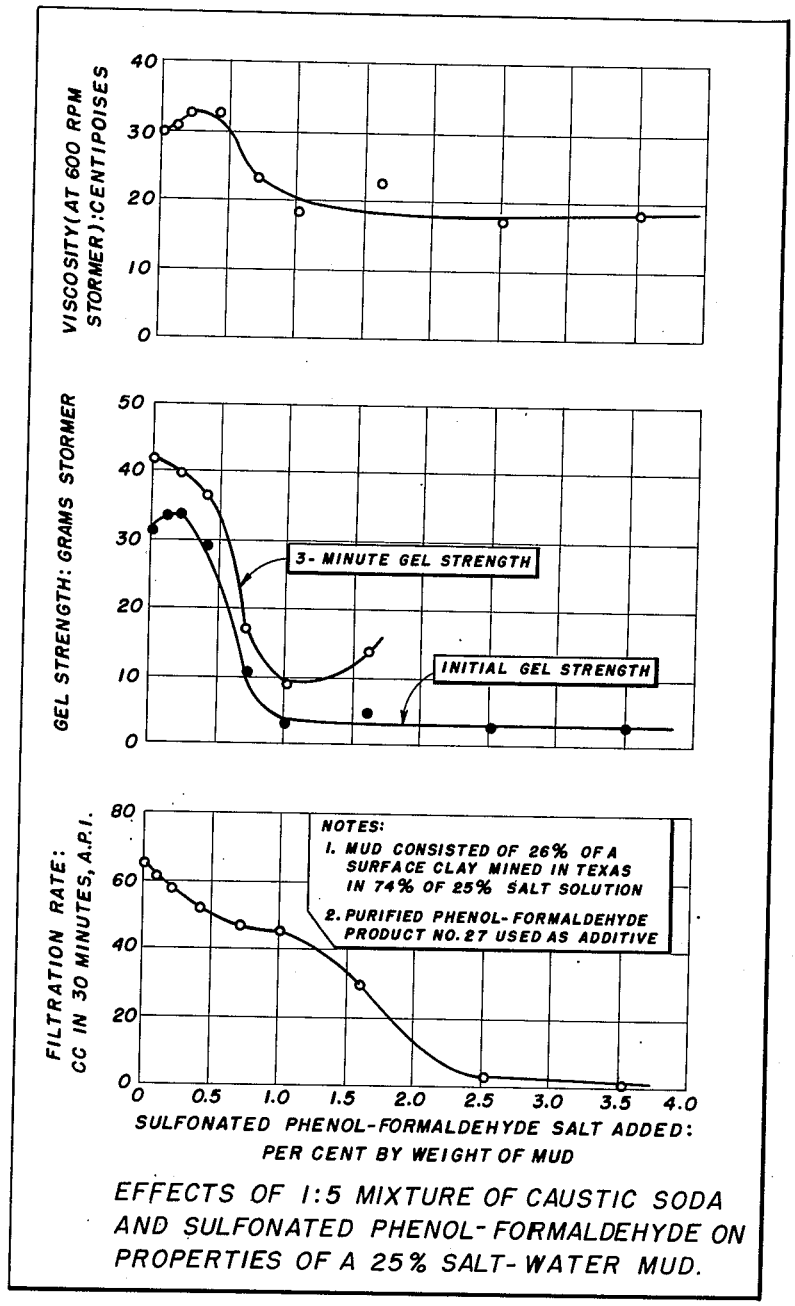

The effect on the mud properties of adding varying quantities of mixtures containing fixed amounts of caustic soda and a purified soluble salt of sulfonated phenol-formaldehyde condensation products (purified product No. 27 of Table II) to a 25% salt water mud was investigated. The mixture added to the mud consisted of 1 part of caustic to 5 parts of the purified condensation product. Varying amounts of this mixture were added to the mud and filtration rate, gel strength, and viscosity were determined. The data obtained are plotted in Fig. 7 and show that additions of the mixture up to concentration of 1.5 weight per cent of the condensation product in the mud decreased the filtration rate moderately and additions of about 2.5% or more yielded extremely low filtration rates. The data further show that the viscosity and gel strength of the mud were greatly reduced by additions of the material in amounts of above about 0.5%.

Figure 8:
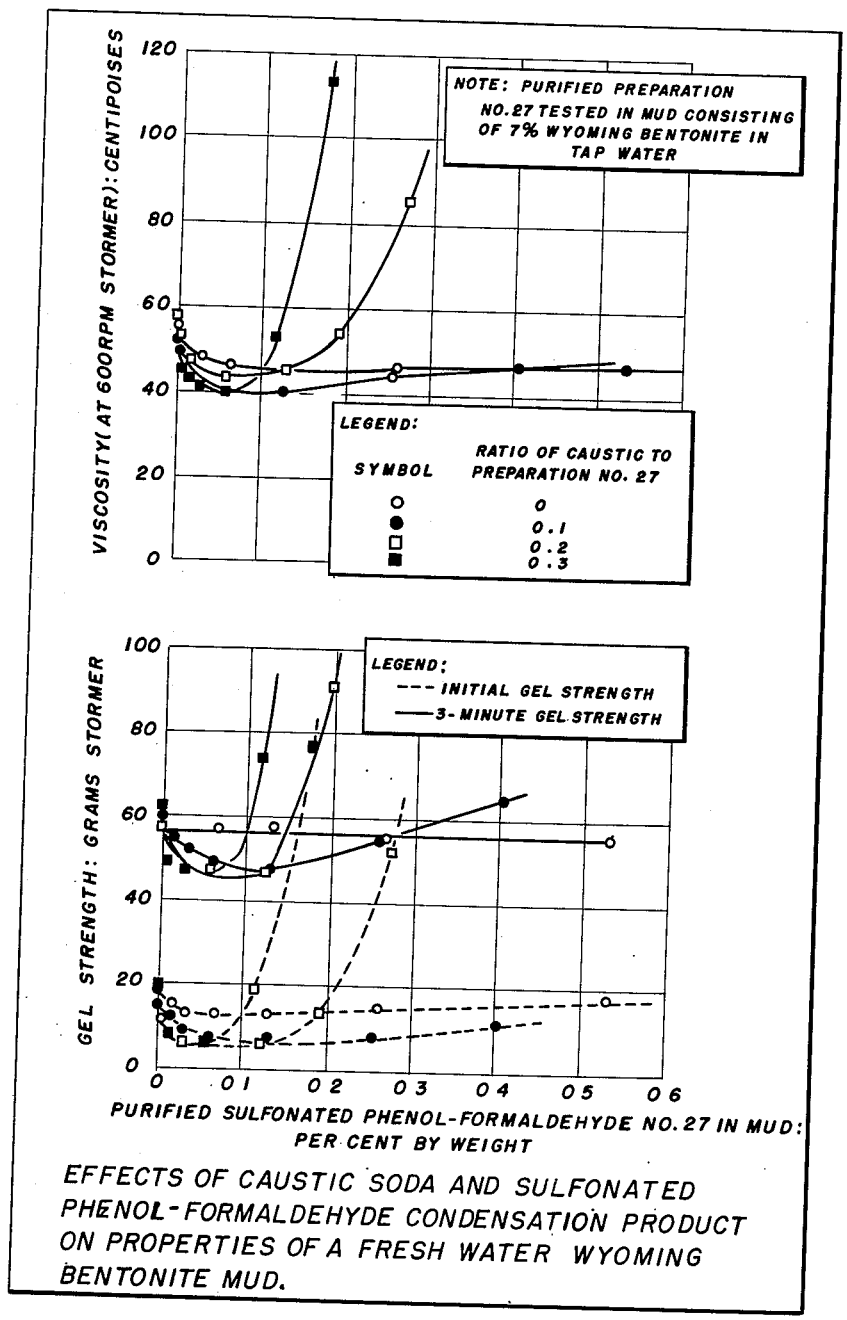

In order to determine the effect of adding an alkali metal hydroxide as well as a non-cation selective, water soluble salt of sulfonated phenol-formaldehyde condensation product to a fresh water and Wyoming bentonite clay drilling mud, varying quantities of three different mixtures containing sodium hydroxide and the condensation product were added to the mud. The first mixture consisted of 9.1 weight per cent of sodium hydroxide, the remainder being condensation product; the second mixture consisted of 16.7 weight per cent of sodium hydroxide, the remainder being condensation product; and the third mixture consisted of 23.0 weight per cent of sodium hydroxide, the remainder being condensation product. These mixtures were added to the mud as aqueous solutions. The viscosity and gel strength of samples of the fresh water mud to which different quantities of the aforementioned mixtures were added were determined and the results are shown graphically in Fig. 8 wherein gel strength and viscosity are plotted against the concentration of condensation product added to the mud. These results show that, while the condensation product alone reduced both viscosity and gel strength of the mud, the mixtures of caustic soda and the condensation were more effective in most concentrations than the product by itself. On the other hand, the mixtures containing higher ratios of caustic soda to condensation product increased viscosity and gel strength greatly when added in such concentrations that the mud contained more than about 0.2 weight per cent of the condensation product.

From the data appearing in Figs. 5 to 8, inclusive, it will be apparent that, with regard to some mud properties, sodium hydroxide enhanced the effectiveness in fresh water and salt water muds of the non-cation selective, water soluble salts of sulfonated phenol-formaldehyde condensation products when both the sodium hydroxide and condensation product were used in relatively small quantities. However, the use of larger quantities of sodium hydroxide and condensation product appears to affect adversely some of the properties of fresh water mud while improving all the properties of the 25% salt water mud materially. The effect of large additions of sodium hydroxide and condensation product in 5% salt water mud appears to be intermediate of the effects obtained of the 25% salt water mud and the fresh water mud. In any event, it appears that sodium hydroxide may frequently be employed advantageously along with the non-cation selective, water soluble salts of sulfonated phenol-formaldehyde condensation products when the ratio of sodium hydroxide to the condensation product is in the range of about 10.0 to 20.0 per cent by weight of the soluble salts of sulfonated phenol-formaldehyde condensation product.

While in the examples hereinbefore given, drilling mud has been used to illustrate my invention, it will be understood that my invention is equally applicable to any suspension or dispersion of a finely divided solid material in an aqueous liquid vehicle.

It will be understood that the term "phenol" in the appended claims refers to mono-hydroxy benzene while the term "a phenol" refers to a class of compounds in which at least one hydroxyl group is attached to a benzene nucleus.

The nature and objects of the present invention having been fully described and illustrated, what I wish to claim as new and useful and to secure by Letters Patent is:

1. A method of treating a suspension of finely divided solid material in an aqueous liquid vehicle comprising the step of adding to the suspension a minor amount sufficient to reduce materially the loss of water by filtration from the suspension of a non-cation selective, water soluble salt of a condensation product of a sulfonated phenol and formaldehyde, said non-cation selective, water soluble salt being prepared by condensing approximately equimolar quantities of a mono-sulfonated di-functionally reactive phenol and formaldehyde in the presence of a condensation catalyst at a temperature in the range of 60° to 100° C. for a time sufficient to form a high molecular weight product but for a time insufficient to cause the product to become insoluble in water, said condensation product being neutralized with a solution containing a cation capable of reacting with the condensation product to form a water soluble salt, the reaction between the mono-sulfonated di-functionally reactive phenol and formaldehyde being permitted to continue for a time sufficient to form a product having, when neutralized, a viscosity of not less than 6 centipoises at 26° C. when 7.15 weight per cent of said neutralized product, based on the weight of the phenol reacted, is dissolved in water.

2. A method in accordance with claim 1 in which said minor amount is in the range of 0.1 weight per cent and 3.0 weight per cent of the suspension.

3. A method of treating a drilling mud used in drilling a borehole by the rotary drilling method comprising the step of adding to the mud a non-cation selective, water soluble salt of a condensation product of sulfonated phenol and formaldehyde, said water soluble salt being added in an amount in the range of 0.1 weight per cent and 3.0 weight per cent of the mud, said water soluble salt being prepared by condensing approximately equimolar quantities of mono-sulfonated phenol and formaldehyde in the presence of an acid condensation catalyst at a temperature in the range of 60° to 100° C. for a time sufficient to form a high molecular weight product but for a time insufficient to cause the product to become insoluble in water, said condensation product being neutralized with a solution containing a cation capable of reacting with said condensation product to form a water soluble salt the reaction between mono-sulfonated phenol and formaldehyde being permitted to continue for a time sufficient to form a product having, when neutralized, a viscosity of not less than 6 centipoises at 26° C. when 7.15 weight per cent of said neutralized product, based on the weight of the phenol reacted, is dissolved in water.

4. A method of treating an aqueous base drilling mud comprising the step of adding to the mud a water soluble salt of a condensation product of sulfonated phenol with formaldehyde, said salt being added in an amount in the range of 0.1 weight per cent and 3.0 weight per cent of the mud, said salt being prepared by reacting approximately equimolar quantities of phenol and sulfuric acid under conditions to form a mono-sulfonated phenol, reacting said mono-sulfonated phenol with an approximately equimolar quantity of formaldehyde in an aqueous solution at a temperature in the range of 60° to 100° C. in the presence of sulfuric acid to form an aqueous solution containing sulfonated phenol-formaldehyde condensation product, the said condensation product being neutralized with an alkali metal hydroxide, the reaction between the sulfonated phenol and formaldehyde being permitted to continue for a time sufficient to form a product having, when neutralized, a viscosity of not less than 6 centipoises at 26° C. when 7.15 weight per cent of said neutralized product, based on the weight of the phenol reacted, is dissolved in water.

5. A composition comprising a major amount of a suspension of finely divided solid material in an aqueous liquid vehicle and a minor amount sufficient to reduce materially the loss of water from the suspension of a non-cation selective, water soluble salt of a condensation product of a mono-sulfonated di-functionally reactive phenol and formaldehyde said water soluble salt being prepared by condensing approximately equimolar quantities of a mono-sulfonated di-functionally reactive phenol with formaldehyde in the presence of a condensation catalyst at a temperature and for a time sufficient to form a high molecular weight product but for a time insufficient to cause the product to become insoluble in water, said condensation product being neutralized with a solution containing a cation capable of reacting with said product to form a water soluble salt, the reaction between the mono-sulfonated di-functionally reactive phenol and formaldehyde being permitted to continue for a time sufficient to form a product having, when neutralized, a viscosity of not less than 6 centipoises at 26° C. when 7.15 weight per cent of said neutralized product, based on the weight of the phenol reacted, is dissolved in water.

6. A composition comprising a major amount of a suspension of finely divided solid material in an aqueous liquid vehicle and a minor amount, in the range of 0.1 weight per cent and 3.0 weight per cent of the suspension, of a non-cation selective, water soluble salt of a condensation product of sulfonated phenol and formaldehyde, said water soluble salt being prepared by condensing approximately equimolar quantities of a mono-sulfonated di-functionally reactive phenol with formaldehyde in the presence of a condensation catalyst at a temperature in the range of 60° to 100° C. for a time sufficient to form a high molecular weight product but for a time insufficient to cause the product to become insoluble in water, said condensation product being neutralized with a solution containing a cation capable of reacting with said product to form a water soluble salt the reaction between the mono-sulfonated di-functionally reactive phenol and formaldehyde being permitted to continue for a time sufficient to form a product having, when neutralized, a viscosity of not less than 6 centipoises at 26° C. when 7.15 weight per cent of said neutralized product, based on the weight of the phenol reacted, is dissolved in water.

7. A drilling mud comprising a major amount of a suspension including finely divided solid material in an aqueous liquid vehicle and a minor amount in the range of 0.1 weight per cent and 3.0 weight per cent based on the mud of a water soluble salt of a condensation product of sulfonated phenol and formaldehyde, said water soluble salt being formed by reacting equimolar quantities of phenol and sulfuric acid to form a mono-sulfonated phenol, reacting said mono-sulfonated phenol with an approximately equimolar quantity of formaldehyde in an aqueous solution at a temperature in the range of 60° to 100° C. in the presence of sulfuric acid to form an aqueous solution containing sulfonated phenol-formaldehyde condensation product, said condensation product being neutralized with an alkali metal hydroxide, the reaction between the sulfonated phenol and formaldehyde being permitted to continue for a time sufficient to form a product having, when neutralized, a viscosity of not less than 6 centipoises at 26° C. when 7.15 weight per cent of said neutralized product, based on the weight of the phenol reacted, is dissolved in water.

8. In a process for drilling a well with well drilling tools wherein there is circulated in the well a water-base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud a non-cation selective, water soluble salt of sulfonated phenol-formaldehyde condensation product in an amount sufficient to lower the fluid loss through said filter cake but insufficient to increase the viscosity of said mud to such an extent as to render said drilling mud uncirculatable and contacting said wall of said well with the resulting drilling mud to form said filter cake thereon said water soluble salt being prepared by condensing a mono-sulfonated di-functionally reactive phenol with formaldehyde in the presence of a condensation catalyst at a temperature and for a time sufficient to form a high molecular weight product but for a time insufficient to cause the product to become insoluble in water, said condensation product being neutralized with a solution containing a cation capable of reacting with said product to form a water soluble salt, the reaction between the mono-sulfonated di-functionally reactive phenol and formaldehyde being permitted to continue for a time sufficient to form a product having, when neutralized, a viscosity of not less than 6 centipoises at 26° C. when 7.15 weight per cent of said neutralized product, based on the weight of the phenol reacted, is dissolved in water.

9. In a process for drilling a well with well drilling tools wherein there is circulated in the well a water-base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud a non-cation selective, water soluble salt of a condensation product of sulfonated phenol with formaldehyde in an amount sufficient to lower the fluid loss through said filter cake and contacting said wall of said well with the resulting drilling mud to form said filter cake thereon, said cation-selective, water soluble salt being prepared by condensing approximately equimolar quantities of a mono-sulfonated di-functionally reactive phenol with formaldehyde in the presence of a condensation catalyst at a temperature in the range of 60° to 100° C. for a time sufficient to form a high molecular weight product but for a time insufficient to cause the product to become insoluble in water, said condensation product being neutralized with a solution containing a cation capable of reacting with said product to form a water soluble salt the reaction between the mono-sulfonated di-functionally reactive phenol and formaldehyde being permitted to continue for a time sufficient to form a product having, when neutralized, a viscosity of not less than 6 centipoises at 26° C. when 7.15 weight per cent of said neutralized product, based on the weight of the phenol reacted, is dissolved in water.

10. In a process for drilling a well with well drilling tools wherein there is circulated in the well a water-base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud a non-cation selective, water soluble salt of a condensation product of sulfonated phenol with formaldehyde in an amount sufficient to lower the fluid loss through said filter cake and contacting said wall of said well with the resulting drilling mud to form said filter cake thereon, said salt being prepared by reacting approximately equimolar quantities of mono-sulfonated phenol and formaldehyde in the presence of an acid reacting condensation catalyst at a temperature in the range of 60° to 100° C. for a time sufficient to form a high molecular weight product but for a time insufficient to cause the product to become insoluble in water, said condensation product being neutralized with a solution containing a cation capable of reacting with said product to form a water soluble salt the reaction between the sulfonated phenol and formaldehyde being permitted to continue for a time sufficient to form a product having, when neutralized, a viscosity of not less than 6 centipoises at 26° C. when 7.15 weight per cent of said neutralized product, based on the weight of the phenol reacted, is dissolved in water.

11. In a process for drilling a well with well drilling tools wherein there is circulated in the well a water-base drilling mud containing colloidal particles of clayey material suspended in sufficient water to render the same circulatable, the method of forming a filter cake on the wall of said well to decrease the loss of fluid from said drilling mud contained therein into surrounding earthen formations which comprises admixing with said drilling mud a non-cation selective, water soluble salt of a condensation product of sulfonated phenol with formaldehyde in an amount sufficient to lower the fluid loss through said filter cake and contacting said wall of said well with the resulting drilling mud to form said filter cake thereon, said water soluble salt being prepared by reacting approximately equimolar quantities of phenol and sulfuric acid to form a mono-sulfonated phenol, reacting said mono-sulfonated phenol with an approximately equimolar quantity of formaldehyde in an aqueous solution at a temperature in the range of 60° to 100° C. in the presence of sulfuric acid to form an aqueous solution containing sulfonated phenol-formaldehyde condensation product, said condensation product being neutralized with an alkali metal hydroxide, the reaction between the sulfonated phenol and formaldehyde being permitted to continue for a time sufficient to form a product having, when neutralized with alkali metal hydroxide, a viscosity of not less than 6 centipoises at 26° C. when 7.15 weight per cent of said neutralized product, based on the weight of the phenol reacted, is dissolved in water.

12. A method in accordance with claim 11 in which said water soluble salt is the sodium salt.

References Cited in the file of this patent

UNITED STATES PATENTS

| Number | Name | Date |
|---|---|---|
| 2,331,281 | Wayne | Oct. 12, 1943 |